(12) United States Patent
Bae

(10) Patent No.: US 6,405,061 B1
(45) Date of Patent: Jun. 11, 2002

(54) METHOD AND APPARATUS FOR DATA ENTRY IN A WIRELESS NETWORK ACCESS DEVICE

(75) Inventor: Hyon S. Bae, Burlingame, CA (US)

(73) Assignee: Youngbo Engineering, Inc. (KR)

( * ) Notice: Subject to any disclaimer, the term of this patent is extended or adjusted under 35 U.S.C. 154(b) by 0 days.

(21) Appl. No.: 09/668,334

(22) Filed: Sep. 22, 2000

Related U.S. Application Data

(63) Continuation-in-part of application No. 09/569,219, filed on May 11, 2000.

(51) Int. Cl.⁷ .................................................. H04B 1/38
(52) U.S. Cl. .......................................... 455/566; 455/90
(58) Field of Search ........................... 455/90, 556, 557, 455/566, 422, 575; 379/433, 434; D14/137, 138

(56) References Cited

U.S. PATENT DOCUMENTS

| | | | |
|---|---|---|---|
| 5,151,946 A | 9/1992 | Martensson | |
| 5,327,584 A | 7/1994 | Adachi et al. | |
| 5,337,346 A | 8/1994 | Uchikura | |
| 5,414,444 A | 5/1995 | Britz | |
| 5,436,954 A | 7/1995 | Nishiyama et al. | |
| 5,715,525 A * | 2/1998 | Jambhekar et al. | 455/90 |
| 5,867,795 A | 2/1999 | Novis et al. | |
| 5,896,575 A * | 4/1999 | Higginbotham et al. | 455/566 |
| 5,907,615 A | 5/1999 | Kaschke | |
| 5,911,485 A | 6/1999 | Rossman | |
| 5,983,073 A | 11/1999 | Ditzik | |
| 5,990,874 A | 11/1999 | Tsumura et al. | |
| 5,991,644 A | 11/1999 | Ogawa | |
| 6,009,469 A | 12/1999 | Mattaway et al. | |
| 6,016,476 A | 1/2000 | Maes et al. | |
| 6,035,180 A * | 3/2000 | Kubes et al. | 455/90 |
| 6,054,990 A | 4/2000 | Tran | |
| D426,218 S | 6/2000 | Abed et al. | |
| 6,073,034 A | 6/2000 | Jacobsen et al. | |
| 6,085,112 A * | 7/2000 | Kleinschmidt et al. | 455/556 |
| 6,087,952 A | 7/2000 | Prabhakaran | |

* cited by examiner

Primary Examiner—Nay Maung
Assistant Examiner—Quochien B. Vuong
(74) Attorney, Agent, or Firm—Sonnenschein, Nath & Rosenthal; Michael A. Molano; John F. Griffith

(57) ABSTRACT

A method and apparatus for adding at least one and preferably two new data entry functions to otherwise conventional flip-type cell phones. One such data entry function is handwritten alpha-numeric entry using the fingertip as the entry device. The other such data entry function is use of the fingertip for point and click. Thus, the apparatus does not require a special tool for data entry. A button or switch added on the side of the phone, permits switching between the two data entry functions. By depressing a button on the side, the user can use the touch pad as a point and click device. This will allow service providers to offer user friendly web pages that look and feel like surfing the web at home or office. The invention also offers the ability to operate both the numeric phone keypad and the touch pad simultaneously.

3 Claims, 2 Drawing Sheets

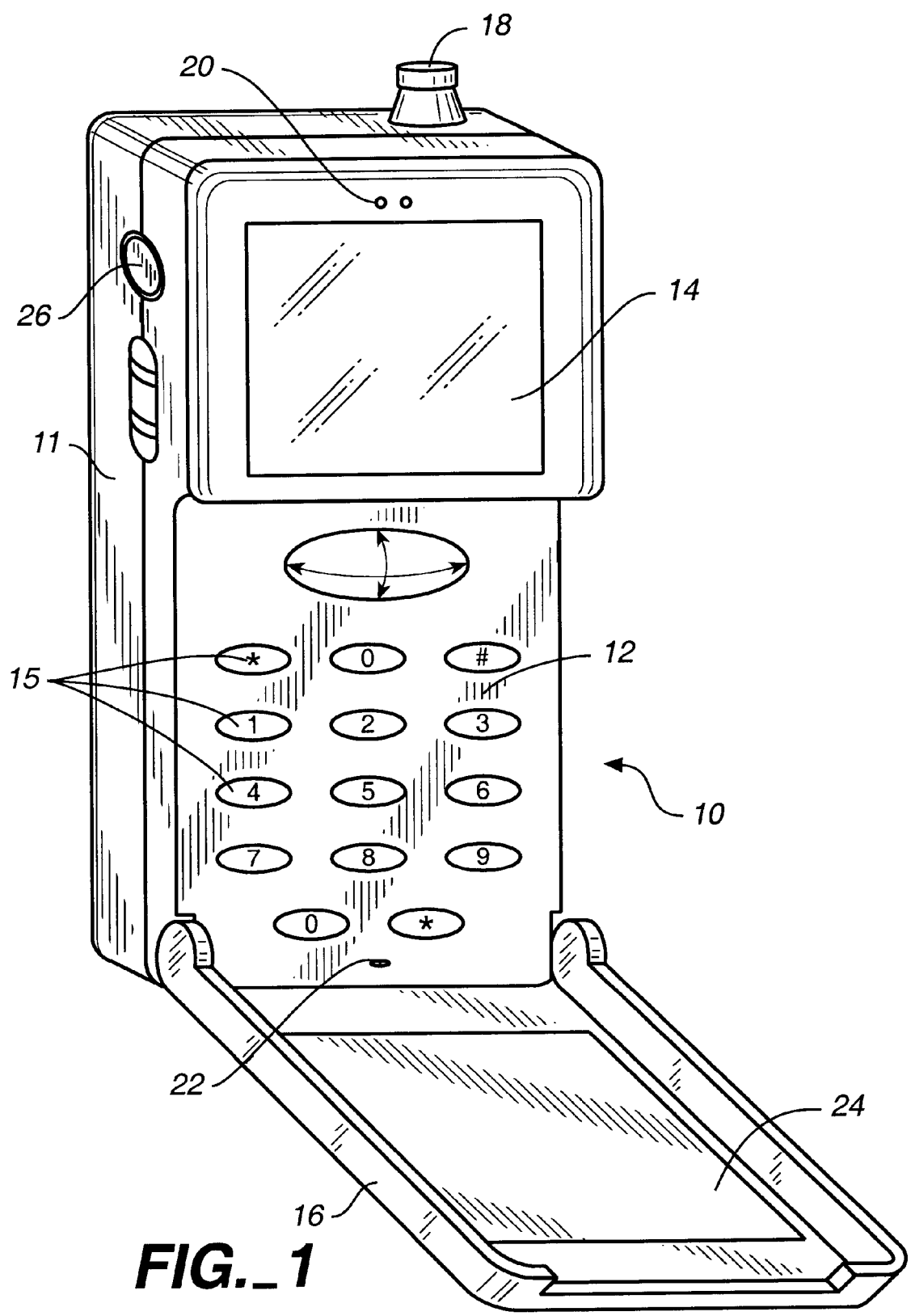
FIG._1

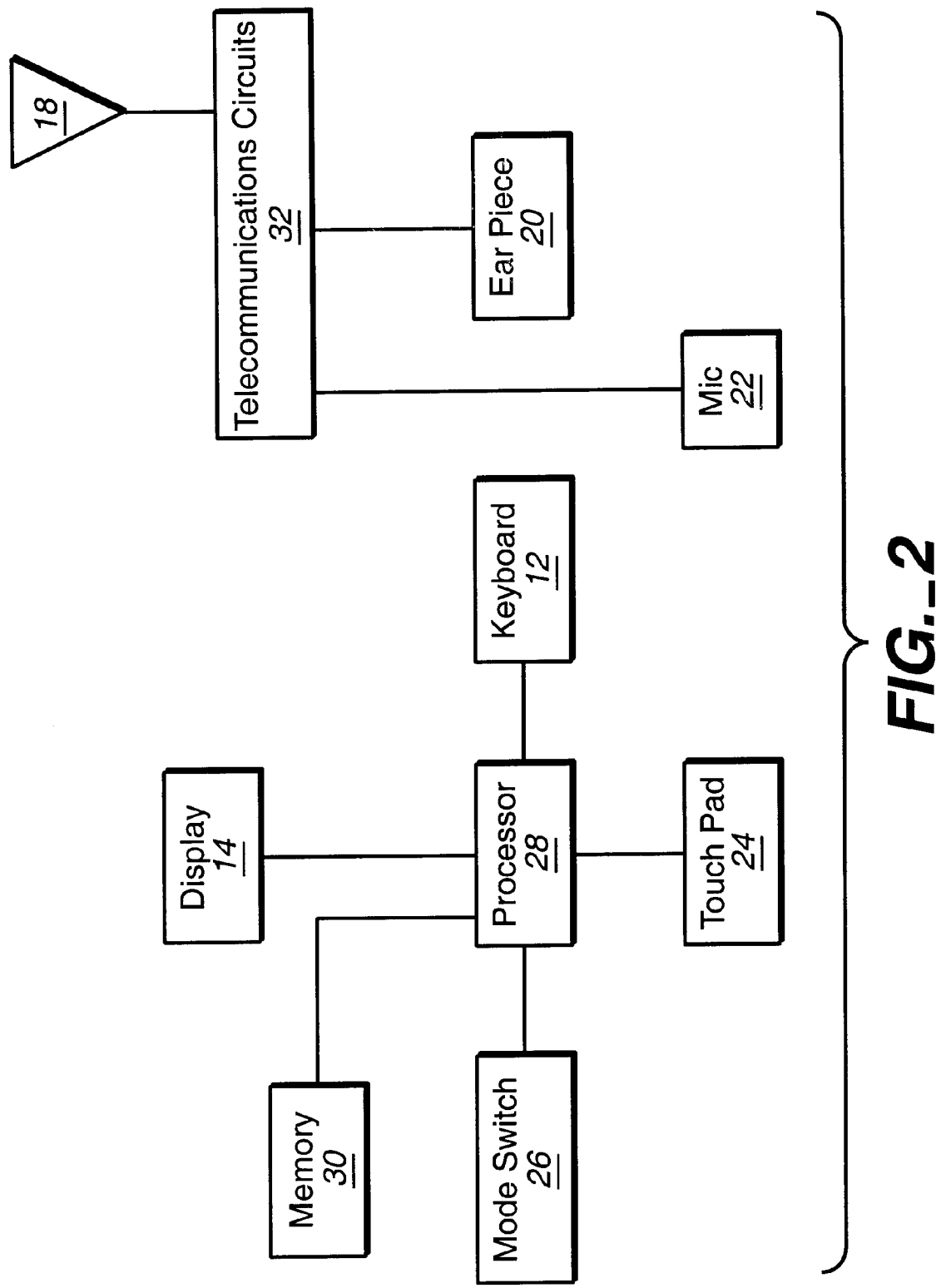
FIG._2

METHOD AND APPARATUS FOR DATA ENTRY IN A WIRELESS NETWORK ACCESS DEVICE

This application is a continuation-in-part of Ser. No. 09/569,219 filed May 11, 2000.

BACKGROUND OF THE INVENTION

FIELD OF THE INVENTION

The present invention relates generally to the field of wireless network access devices such as the mobile or cellular phone. The invention relates more specifically to use of a touch pad pointing device in the flip key pad cover of a mobile or cell phone to enable fingertip data entry as well as point and click (mouse) control of a cursor on a display portion of the phone.

BACKGROUND ART

With the deployment and rapid expansion of wireless Internet (HDML), the demands for wireless Internet devices are also growing at a rapid rate. One of the most popular classes of wireless Internet devices is the mobile phone. They are popular because they are compact and offer multiple functions; such as telephone, PDA and Internet Access. Their biggest drawback is the difficulty in entering alpha-numeric data to utilize the PDA and Internet functions. The fundamental design of a phone and the continuing miniaturization of the device make it that much more difficult to enter alphanumeric data.

There are a number of previously issued U.S. Patents which disclose mobile and cell phones having added input functions such as extra function keys, a touch pad that works in contact with alpha-numeric keys and a touch pad that permits adjustment of certain phone parameters such as volume and the like. However, none of the prior art known to the applicant provides a convenient manual data entry mechanism that may also provide mouse-type point and click cursor control.

SUMMARY OF THE INVENTION

The present invention comprises a method and apparatus for adding at least one and preferably two new data entry functions to otherwise conventional flip-type cell phones. One such data entry function is handwritten alpha-numeric entry using the fingertip as the entry device. The other such data entry function is use of the fingertip for point and click. A button or switch added on the side of the phone, permits switching between the two data entry functions.

By utilizing software, such as the Palm Graffiti® system or Microsoft's Windows CE®, the user can enter alphanumeric data by hand writing in the touch pad area. The invention offers the additional advantage of not requiring a special tool such as a pointer or pen. Due to the relatively large area of the touch pad, the user can enter the data with his or her fingertip.

By depressing a button on the side, the user can use the touch pad as a point and click device. This will allow service providers to offer user friendly web pages that look and feel like surfing the web at home or office.

The invention also offers the ability to operate both the numeric phone keypad and the touch pad simultaneously.

Also, the invention impacts the overall size only minimally. The additional height requirement for the touch pad is only 1 mm.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 1 illustrates a preferred embodiment of the invention shown in an operational configuration with the hinged key pad cover opened to reveal the touch pad member ready for use.

FIG. 2 is a schematic block diagram of the interior circuits of the embodiment of FIG. 1.

DETAILED DESCRIPTION OF THE INVENTION

Referring to the accompanying drawing figures, it will be seen that a cell phone 10 comprises a housing 11 including a numeric keypad 12 comprising a plurality of keys 15. The phone 10 further comprises an LCD or equivalent display 14, a hinged keypad cover 16 and an extendable antenna 18 extending from the upper end of housing 11. Also provided are speaker or ear piece 20 and microphone or mouthpiece 22.

Cellular telephone 10 features a touch pad member 24 and a mode switch 26. Touch pad devices are well known in the electronic data arts. For example, U.S. Pat. Nos. 5,856,822 issued Jan. 5, 1999 to Du et al. and 5,956,019 issued Sep. 21, 1999 Bang et al. disclose touch pad devices. To the extent that each such patent discloses the technical characteristics of touch pad devices, such disclosures are hereby incorporated herein by reference.

Mode switch 26 provides for two distinct modes of operation for touch pad member 24. In a first mode, the touch pad member provides for manual data entry, such as by fingertip contact or use of a stylus (not shown), for handwritten alphanumeric data. This mode can be readily accomplished on touch pad member 24 by utilizing software such as the Palm Graffiti® system or Microsoft's Windows CE® that is stored in memory 30 for use by processor 28.

In a second mode, touch pad member 24 provides for computer mouse-type point and click operation such as commonly found on laptop computers. As seen in FIG. 1, touch pad member 24 occupies substantially all of the inside planar surface of keypad cover 16, but without adding any significant thickness to the keypad cover. Moreover, switch 26 does not add significantly to the volume of phone 10 or to the dimensions of housing 11. Thus the invention adds significant new data entry capabilities to a cell phone such as for facilitating use of the phone in an Internet browser mode of operation. Yet such novel features are provided without any significant change in the dimensions of the underlying mobile or cellular phone.

As shown in FIG. 2, the interior circuits of phone 10 include a processor 28 for controlling and interconnecting the telecommunications circuits and user interface components of phone 10. The telecommunications circuits 32 include the necessary transmitter circuits, receiver circuits and audio amplification circuits required for cellular phone communication, as are well known in the art. Telecommunications circuits 32, in addition to being coupled to processor 28, has a radio frequency output coupled to antenna 18, an audio output coupled to ear piece 20, and an audio input coupled to microphone 22. The processor 28 operates in conjunction with memory 30 coupled thereto, which memory includes both volatile and non-volatile storage devices. Processor 28 is coupled to keyboard 12, display 14, touch pad 24, and mode switch 26 for interfacing with the user of phone 10. The mode switch input to processor 28 being utilized to initiate predetermined programs for interpreting inputs from touch pad 24, as discussed above.

Having thus disclosed a preferred embodiment of the invention, it being understood that various modifications and additions are contemplated and will now be apparent to those having the benefit of the above description, what is claimed is:

1. A wireless communications network portable phone comprising:
   a housing;
   a processor disposed in said housing;
   a keyboard mounted to said housing and coupled to said processor;
   a display mounted to said housing and coupled to said processor;
   a speaker mounted in said housing;
   a microphone mounted in said housing;
   a keyboard cover hinged to said housing, the cover having an interior surface;
   a touch pad member separate from said display mounted on said hinged keyboard cover on said interior surface and connected to said processor and being responsive to fingertip contact for entering handwritten alpha-numeric data into said phone and a computer mouse function for point and click control of a cursor on said display; and,
   a mode switch extending from said housing remote from said touch pad member, said mode switch being connected to said processor for selection of two distinct data entry functions of said touch pad member, one of said functions being said handwritten alpha-numeric data entry and the other of said functions being said computer mouse function.

2. In a wireless network portable communications device having a housing, a keyboard, a display, a speaker, a microphone, an antenna, interior circuits including a processor, and a hinged keyboard cover, the cover having an interior surface; an improvement comprising:
   a planar touch pad member separate from said display mounted on said hinged keyboard cover on said interior surface and connected to said processor, said touch pad being responsive to fingertip contact for point and click control of a cursor on said display and for entering handwritten alpha-numeric data; and,
   a mode switch extending from said housing remote from said touch pad member, said mode switch being connected to said processor for selection of two distinct data entry functions of said touch pad member, one of said functions being said handwritten alpha-numeric data entry and the other of said functions being said point and click control of the cursor.

3. A method for entering data in a wireless communications network portable phone, the phone having a housing, a keyboard, a display, a speaker, a microphone, an antenna, interior circuits and a hinged keyboard cover, the cover having an interior surface; the method comprising the steps of:
   a) providing a planar touch pad member separate from the display on said interior surface;
   b) connecting said touch pad member to said interior circuits;
   c) configuring said touch pad member to be responsive to fingertip contact for cursor control on the display and handwritten data entry by said fingertip contact;
   d) providing a mode switch to extend from the housing remote from the display; and,
   e) connecting said mode switch to said interior circuits for selecting between a handwritten data entry mode of operation and a cursor control mode of operation of said touch pad member.

* * * * *